(12) United States Patent
Igarashi et al.

(10) Patent No.: US 11,292,488 B2
(45) Date of Patent: Apr. 5, 2022

(54) CONTROL DEVICE AND ELECTRIC VEHICLE

(71) Applicant: SUZUKI MOTOR CORPORATION, Hamamatsu (JP)

(72) Inventors: Yuki Igarashi, Hamamatsu (JP); Yu Inoue, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 123 days.

(21) Appl. No.: 16/740,065

(22) Filed: Jan. 10, 2020

(65) Prior Publication Data

US 2020/0239021 A1 Jul. 30, 2020

(30) Foreign Application Priority Data

Jan. 28, 2019 (JP) .............................. JP2019-012133

(51) Int. Cl.
*B60W 50/14* (2020.01)
*B60Q 9/00* (2006.01)
(Continued)

(52) U.S. Cl.
CPC ............. *B60W 50/14* (2013.01); *B60Q 9/008* (2013.01); *B60W 30/08* (2013.01); *B60W 40/04* (2013.01);
(Continued)

(58) Field of Classification Search
CPC .. B60W 50/14; B60W 30/08; B60W 2554/40; B60W 2050/143;
(Continued)

(56) References Cited

U.S. PATENT DOCUMENTS 9,384,649 B2 *  7/2016  Kumai .................... G08B 21/18
10,426,675 B1 * 10/2019  Erickson .................. A61G 5/04
(Continued)

FOREIGN PATENT DOCUMENTS

CN       104442571 A    3/2016
CN       103650015 B    7/2016
(Continued)

OTHER PUBLICATIONS

"Pump Those Brakes, Big Guy: Ford's Pre-Collision Assist is Here to Help" Commercial blog written by Kentwood Ford. Accessible at https://www.kentwoodford.com/2018/07/26/pre-collision-assist.html (Year: 2018).*
(Continued)

*Primary Examiner* — Peter D Nolan
*Assistant Examiner* — Tanya C Sienko
(74) *Attorney, Agent, or Firm* — Stein IP, LLC (57) ABSTRACT

There is provided a control device configured to perform a collision preventing control based on an output of an obstacle detection unit. A risk level determination unit determines a collision risk level based on a distance between the obstacle and the electric vehicle. A control level adjustment unit adjusts a control level of the collision preventing control based on the collision risk level. The control level adjustment unit lowers the control level when a releasing unit configured to temporarily release the collision preventing control is operated by a driver during the collision preventing control and causes the electric vehicle to display presence of the obstacle.

8 Claims, 6 Drawing Sheets

(51) Int. Cl.
*B60W 30/08* (2012.01)
*B60W 40/04* (2006.01)

(52) U.S. Cl.
CPC . *B60W 2050/143* (2013.01); *B60W 2050/146* (2013.01); *B60W 2300/365* (2013.01); *B60W 2554/40* (2020.02)

(58) Field of Classification Search
CPC ............ B60W 2050/146; B60Q 9/008; B60K 2370/179; B60K 2370/178; B60K 2370/152; B60K 37/06; B60K 35/00; B62K 5/01; B62J 99/00; A61G 5/045; A61G 5/10
See application file for complete search history.

(56) References Cited

U.S. PATENT DOCUMENTS

| | | | |
|---|---|---|---|
| 2008/0042814 A1* | 2/2008 | Hurwitz ................ | B60W 50/14 340/435 |
| 2012/0095633 A1* | 4/2012 | Kume ..................... | B60L 15/10 701/22 |
| 2013/0341977 A1 | 12/2013 | Kiefer et al. .............. | 297/217.3 |
| 2013/0342330 A1 | 12/2013 | Kiefer et al. .............. | 340/407.1 |
| 2013/0342334 A1 | 12/2013 | McQueen et al. .......... | 340/436 |
| 2013/0342335 A1 | 12/2013 | McQueen et al. .......... | 340/436 |
| 2013/0342336 A1 | 12/2013 | Kiefer et al. ............... | 340/436 |
| 2013/0342337 A1 | 12/2013 | Kiefer et al. ............... | 340/438 |
| 2013/0342338 A1 | 12/2013 | Green et al. ................ | 340/438 |
| 2013/0342339 A1 | 12/2013 | Kiefer et al. ............... | 340/438 |
| 2013/0342364 A1 | 12/2013 | Grimm et al. .............. | 340/901 |
| 2013/0342365 A1 | 12/2013 | Kiefer et al. ............... | 340/901 |
| 2013/0342366 A1 | 12/2013 | Kiefer et al. ............... | 340/901 |
| 2014/0132405 A1 | 5/2014 | Kiefer et al. ............... | 340/438 |
| 2014/0132407 A1 | 5/2014 | Kumai et al. ............... | 340/439 |
| 2014/0180520 A1* | 6/2014 | Kume .................... | B60L 15/20 701/22 |
| 2014/0346823 A1 | 11/2014 | Stebbins et al. ........... | 297/217.1 |
| 2015/0245962 A1* | 9/2015 | Furuta ..................... | A61G 5/06 700/257 |
| 2016/0059854 A1 | 3/2016 | Ohsugi et al. | |
| 2017/0101056 A1* | 4/2017 | Park ......................... | B60R 1/00 |
| 2021/0027486 A1* | 1/2021 | Kaino .................. | G05D 1/0251 |

FOREIGN PATENT DOCUMENTS

| | | | | |
|---|---|---|---|---|
| CN | 105993039 | A | 10/2016 | |
| CN | 107000608 | A | 8/2017 | |
| EP | 1182089 | A2 * | 2/2002 | ......... B60R 16/0232 |
| EP | 3 225 456 | A1 | 11/2015 | |
| JP | 103578293 | A | 2/2014 | |
| JP | 2014-226194 | A | 12/2014 | |
| JP | 5673467 | B2 * | 2/2015 | ............. Y02T 10/72 |
| JP | 2017184358 | A * | 10/2017 | |
| JP | 6291232 | B2 | 2/2018 | |
| JP | 6291232 | B2 * | 3/2018 | |

OTHER PUBLICATIONS

"Pump Those Brakes, Big Guy: Ford's Pre-Collision Assist is Here to Help" Commercial blog written by Kentwood Ford. Accessible at httos:/Avww.kentwoodford.com/2018/07/26/pre-collision-assist.html (Year: 2018) (Year: 2018).*

Chinese Office Action dated Apr. 19, 2021, issued by the State Intellectual Property Office of People's Republic of China in corresponding application CN 202010064071.3.

French Office Action dated Feb. 26, 2021, issued by the National Institute of Industrial Property in corresponding application FR 2000420.

Chinese Office Action dated Nov. 26, 2021, issued by the State Intellectual Property Office of People's Republic of China in corresponding application CN 202010064071.3.

* cited by examiner

| COLLISION RISK LEVEL | STATE | COLLISION PREVENTING CONTROL CONTENT |
|---|---|---|
| LV0 | NORMAL STATE | NONE |
| LV1 | WARNING DISPLAYED STATE | WARNING DISPLAY |
| LV2 | ALARM NOTIFIED STATE | WARNING DISPLAY + ALARM (SOUND) |
| LV3 | DECELERATION RECOMMENDED STATE | WARNING DISPLAY + ALARM (SOUND) + DECELERATION |
| LV4 | STOP RECOMMENDED STATE | WARNING DISPLAY + ALARM + STOP |

CONTROL DEVICE AND ELECTRIC VEHICLE

CROSS-REFERENCE TO RELATED APPLICATIONS

The disclosure of Japanese Patent Application No. 2019-012133 filed on Jan. 28, 2019, including specification, drawings and claims is incorporated herein by reference in its entirety.

TECHNICAL FIELD

The present disclosure relates to a control device and an electric vehicle.

BACKGROUND

In a boarding-ride electric vehicle represented by an electric wheelchair such as a power scooter, a driver is often an elderly disabled person. Therefore, chances of derailment or falling on gutters, cliffs, dams, railroad crossings, and roads without guard rails and collisions with obstacles such as road steps, trees, and pedestrians are higher compared with a healthy person.

For example, the following Patent Document 1 discloses a technique of attaching a laser radar or a stereo camera to a front side of a host vehicle (an electric vehicle) to detect an obstacle in front of the host vehicle. In Patent Document 1, when the obstacle is detected in a predetermined region in a traveling direction of the host vehicle, driving assistance (for example, deceleration control and alarm output) is performed to the host vehicle. A degree of the driving assistance is controlled stepwise in accordance with a distance between the host vehicle and the obstacle.

Patent Document 1: Japanese Patent Application Publication No. 2014-226194 A

However, the electric vehicle such as the above-mentioned power scooter has mobility of traveling on a sidewalk and is treated as a pedestrian. Therefore, compared with a passenger car traveling on a road, a situation is likely to occur in which an obstacle (a person, a bicycle, or the like) comes from right front, leading to an assumed case where the electric vehicle travels while avoiding the obstacle coming from front. In this case, when the driving assistance described above is strictly performed in order to prevent a collision with an obstacle, vehicle control such as alarm output, deceleration, and stop would be frequently performed each time an obstacle is present in front. Accordingly, the driver (the user) may feel uncomfortable.

SUMMARY

It is at least one of objects of the present disclosure to provide a control device and an electric vehicle that can perform collision preventing control in an electric vehicle such as a power scooter without causing discomfort to a driver.

According to an aspect of the embodiments of the present disclosure, there is provided a control device configured to perform a collision preventing control between an obstacle and an electric vehicle based on an output of an obstacle detection unit which is configured to detect the obstacle within a predetermined range in a traveling direction of the electric vehicle, the control device comprising: a risk level determination unit configured to determine a collision risk level between the obstacle and the electric vehicle based on a distance between the obstacle and the electric vehicle; and a control level adjustment unit configured to adjust a control level of the collision preventing control based on the collision risk level and perform the collision preventing control with the adjusted control level, wherein the control level adjustment unit lowers the control level when a releasing unit configured to temporarily release the collision preventing control is operated by a driver during the collision preventing control and causes the electric vehicle to display presence of the obstacle.

According to another aspect of the embodiments of the present disclosure, there is provided an electric vehicle comprising: an obstacle detection unit configured to detect an obstacle within a predetermined range in a traveling direction of the electric vehicle; a display unit configured to display presence of the obstacle; a control device configured to perform a collision preventing control between the obstacle and the electric vehicle based on an output of the obstacle detection unit; and a releasing unit configured to temporarily release the collision preventing control, wherein the control device includes: a risk level determination unit configured to determine a collision risk level between the obstacle and the electric vehicle based on a distance between the obstacle and the electric vehicle; and a control level adjustment unit configured to adjust a control level of the collision preventing control based on the collision risk level and perform the collision preventing control with the adjusted control level, and wherein the control level adjustment unit lowers the control level when the releasing unit is operated by a driver during the collision preventing control and causes the display unit to display the presence of the obstacle.

With the above configuration, it is possible to perform collision preventing control in an electric vehicle such as a power scooter without causing discomfort to a driver.

DETAILED DESCRIPTION OF THE EMBODIMENTS

Hereinafter, an embodiment of the present disclosure will be described in detail with reference to the accompanying drawings. In the following description, a power scooter for an elderly person will be described as an example of an electric vehicle to which the present disclosure is applied, but the application object may be changed without being limited thereto. For example, the present disclosure may also be applied to other types of electric vehicles such as an electric wheelchair for a person having a disorder in their body. In terms of direction, a driver is the reference, based on which an arrow FR indicates a vehicle front side, an arrow RE indicates a vehicle rear side, an arrow UP indicates a vehicle upper side, an arrow LO indicates a vehicle lower side, an arrow L indicates a vehicle left side, and an arrow R indicates a vehicle right side, respectively. That is, the direction indicated by the arrow FR is a traveling direction of the vehicle.

Figure 1:
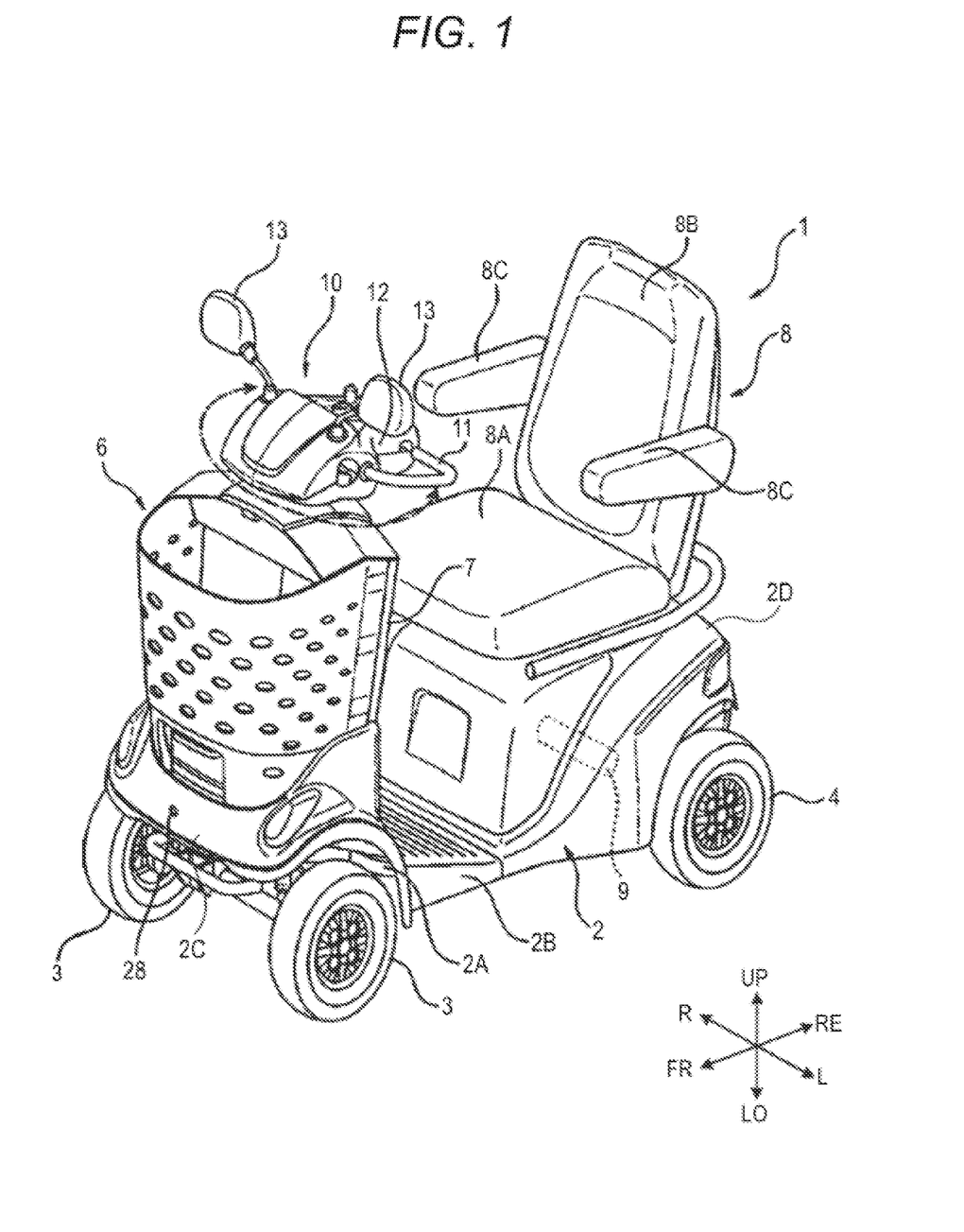
FIG. 1 is an overall perspective view of an electric vehicle according to an embodiment.
Figure 2:
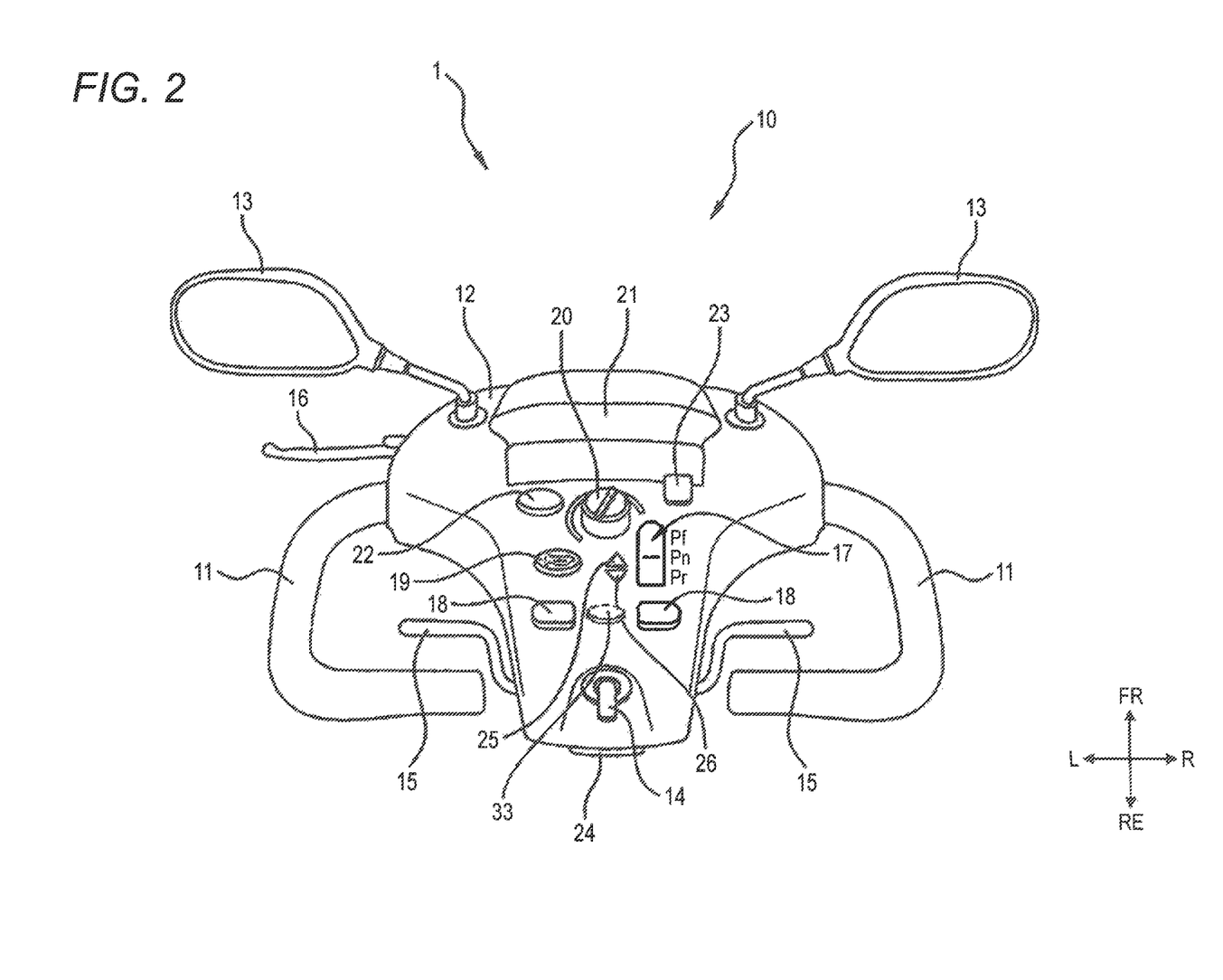
FIG. 2 is a perspective view of a handle peripheral configuration of the electric vehicle in FIG. 1 as viewed from a driver.
Figure 3:
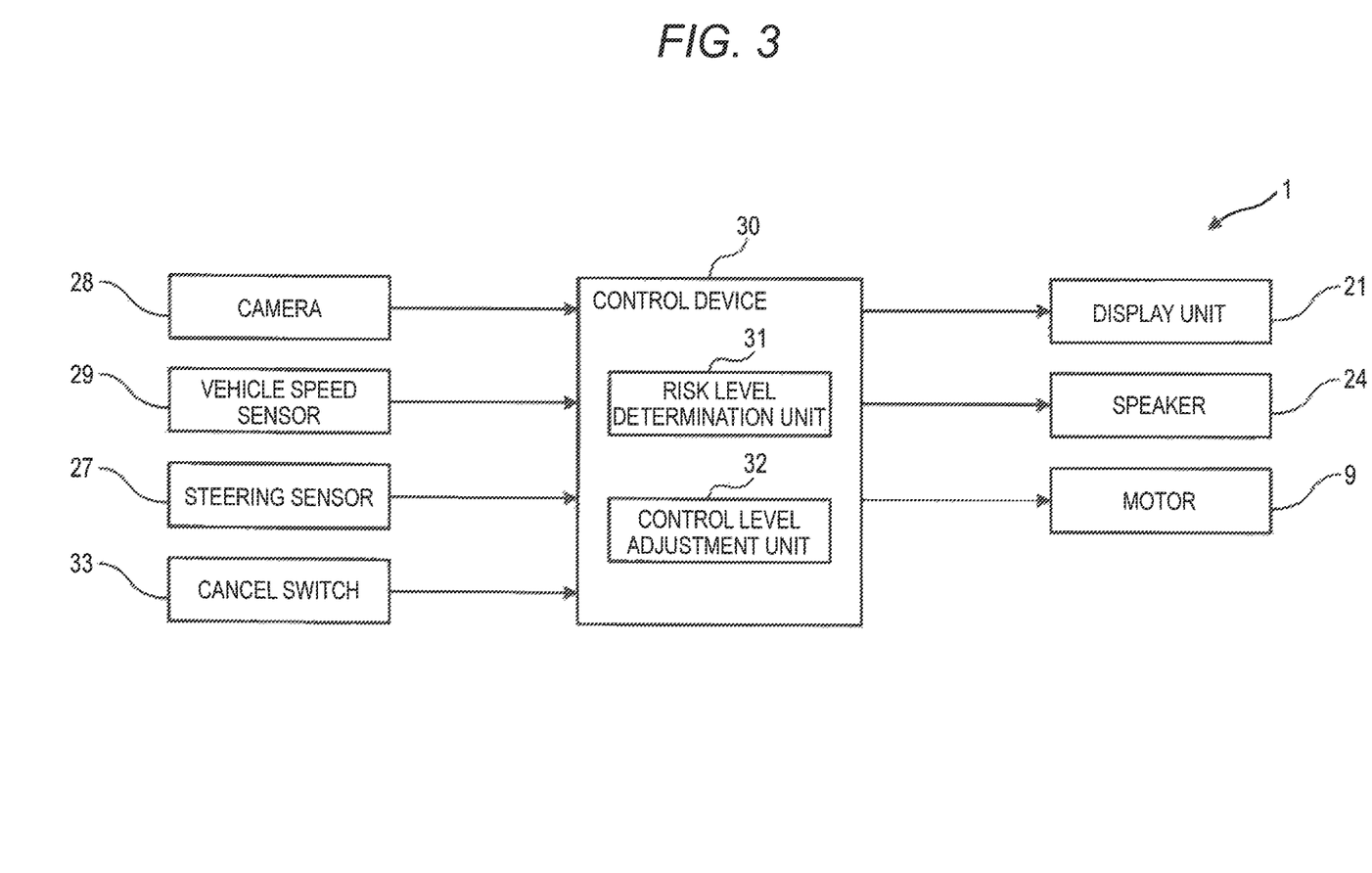
FIG. 3 is a functional block diagram of the electric vehicle according to the present embodiment.

An electric vehicle according to the present embodiment will be described with reference to FIGS. 1 to 3. FIG. 1 is an overall perspective view of the electric vehicle according to the present embodiment. FIG. 2 is a perspective view of a handle peripheral configuration of the electric vehicle in FIG. 1 as viewed from the driver. FIG. 3 is a functional block diagram of the electric vehicle according to the present embodiment. The electric vehicle is not limited to the following configuration and may be modified as appropriate.

First, a schematic configuration of an electric vehicle 1 according to the present embodiment will be described. As shown in FIG. 1, the electric vehicle 1 is constituted by a power scooter that travels on a sidewalk. The driver is often an elderly person and the electric vehicle 1 is treated as a pedestrian for legal purposes. Specifically, the electric vehicle 1 includes a vehicle body 2 in which an exterior cover is attached to a vehicle body frame 2A. The exterior cover includes a floor portion 2B on which the driver places feet, a front cover 2C disposed on a front side of the vehicle body, and a rear cover 2D disposed on a rear side of the vehicle body.

The vehicle body frame 2A constitutes an overall frame part and extends in a front-rear direction. A pair of left and right front wheels 3 are disposed on the front side of the vehicle body 2. A pair of left and right rear wheels 4 are disposed on the rear side of the vehicle body 2. A handle unit 10 that allows the vehicle to be steered is disposed over the front wheels 3.

The front wheels 3 and the handle unit 10 are coupled by a steering shaft (not shown). The steering shaft extends up and down. As will be described in detail below, the steering shaft is provided with a steering sensor 27 (see FIG. 3) that detects a steering angle of a handlebar 11.

The periphery of the steering shaft is covered with a leg shield 7. The leg shield 7 constitutes a part of the exterior cover and rises upward from a front portion of the vehicle body. The leg shield 7 has a function as a windshield that protects the periphery of the feet of the driver seated on a seat 8, which will be described below, so that wind or the like does not directly hit the periphery of the feet.

A front basket 6 is disposed in front of the leg shield 7. The front cover 2C is provided below the front basket 6 to cover the front wheels 3 from above. As will be described in detail below, a camera 28 is provided on a front surface of the front cover 2C as an obstacle detection unit that detects an obstacle within a predetermined range in the traveling direction of the electric vehicle 1. The camera 28 includes an imaging unit such as a stereo camera or a three-dimensional distance image camera and has a predetermined imaging range within the predetermined range in the traveling direction. In the present embodiment, the predetermined range in a front side in the traveling direction is defined as the detection range (the imaging range) of the obstacle, but the present disclosure is not limited thereto. For example, not only the front side but also a lateral side and a rear side may be set as the predetermined detection range.

The seat 8 for the driver is disposed over a rear portion of the vehicle body 2. The seat 8 includes a seat cushion 8A on which the driver sits, a seatback 8B that constitutes a backrest of the driver, and a pair of left and right armrests 8C. The seatback 8B extends upward from a rear end of the seat cushion 8A. The armrests 8C are provided on two side portions of the seatback 8B.

A motor 9 and a battery (not shown) for the rear wheels 4 are disposed below the seat 8. The motor 9 drives the rear wheels 4 via a differential device (not shown). The motor 9 is driven by electric power of the battery. The motor 9 and the battery are covered with the rear cover 2D. In addition to the motor 9 and the battery, various electrical components such as a control device 30 to be described below and a vehicle speed sensor 29 (see FIG. 3) that detects a vehicle speed of the electric vehicle 1 are disposed inside the rear cover 2D.

Next, a detailed configuration of the handle unit 10 will be described. The handle unit 10 is rotated by the driver seated on the seat 8. As shown in FIG. 2, the handle unit 10 includes a pair of left and right handlebars 11 held by the driver and a switch box 12 in which various operation switches are disposed.

The pair of handlebars 11 protrude from left and right side surfaces of the switch box 12 and are bent in a substantially U shape in a plan view. In addition, rearview mirrors 13 are disposed at right and left corners of the switch box 12, separately.

The switch box 12 is disposed in the middle of the entire handle unit 10. The switch box 12 is equipped with an operation device, a display device, and the like that are necessary for driving the electric vehicle 1. Specifically, a power switch 14 is disposed in the middle of a near upper surface of the switch box 12. The power switch 14 is switched between an ON position and an OFF position by rotation operation. When the power switch 14 is operated to the ON position, power of the vehicle is turned on, and when the power switch 14 is operated to the OFF position, the power of the electric vehicle 1 is turned off.

A pair of accelerator levers 15 are provided on near right and left surfaces of the switch box 12. The accelerator levers 15 extend towards outside the vehicle from side surfaces of the switch box 12 in vicinity of grip portions of the handlebars 11. The accelerator levers 15 may be operated by being pressed downward from an initial position. The accelerator levers 15 perform acceleration in a traveling direction that is selected by a traveling direction switching switch 17 to be described below. When the accelerator levers 15 are pressed, the electric vehicle 1 travels in a predetermined direction, and when hands are released from the accelerator levers 15, a brake is applied to the motor 9 to stop the electric vehicle 1.

A brake lever 16 is provided on a side surface of a front left corner of the switch box 12. The brake lever 16 protrudes leftward and is backward rotatable from an initial position with its base end serving as a starting point. The brake lever 16 functions as a brake when the electric vehicle 1 is pushed through hands and functions as a parking brake when the electric vehicle 1 is parked.

The switch box 12 is further provided with, on the upper surface thereof, the traveling direction switching switch 17, a winker switch 18, an alarm switch 19, a speed adjustment knob 20, a display unit 21, an audio switch 22, a distance reset switch 23, a forward confirmation lamp 25, and a rearward confirmation lamp 26.

The traveling direction switching switch 17 is constituted by a toggle switch that is tiltable in the front-rear direction. The traveling direction switching switch 17 switches the traveling direction of the vehicle to forward or rearward. The traveling direction switching switch 17 is rotatable between a forward position indicating forward movement and a rearward position indicating rearward movement. The forward and rearward positions of the traveling direction switching switch 17 are indicated by Pf and Pr in FIG. 2. Pn located between Pf and Pr indicates an intermediate position (a neutral position).

A pair of left and right winker switches 18 are provided. When the left winker switch 18 is operated, a left turn is signaled, and when the right winker switch 18 is operated, a right turn is signaled.

The alarm switch 19 is constituted by a push-button switch. When the alarm switch 19 is pressed, an alarm sound is issued from a speaker 24.

The speed adjustment knob 20 is a dial operation unit and is disposed substantially in the middle of the upper surface of the switch box 12. By operating the speed adjustment knob 20, a maximum speed in the forward movement is adjustable within a predetermined speed range. For example, the maximum speed of the electric vehicle 1 is adjustable within a range of 2 km/h to 6 km/h.

The display unit 21 is constituted by a display that displays predetermined information on the electric vehicle 1 in a timely manner and is disposed in the middle of a front side of the upper surface of the switch box 12. The display unit 21 displays, for example, a traveling speed, a traveling distance (a trip meter), and a charging state of the battery. As will be described in detail below, the display unit 21 displays a warning when the electric vehicle 1 may collide with an obstacle in front.

The audio switch 22 is constituted by a push-button switch and sets an audio guidance function on or off.

The distance reset switch 23 is constituted by a push-button switch. The distance reset switch 23 is operated to reset the traveling distance displayed on the display unit 21 to zero.

The forward confirmation lamp 25 is turned on when the traveling direction switching switch 17 is set to the forward position and the electric vehicle 1 may move forward. On the other hand, the rearward confirmation lamp 26 is turned on when the traveling direction switching switch 17 is set to the rearward position and the electric vehicle 1 may move backward.

The speaker 24 is provided on a near lower surface of the switch box 12. The speaker 24 issues audio guidance or an alarm. Arrangement locations of the various components mounted on the switch box 12 are not limited to the examples described above and may be modified as appropriate.

Next, the control device 30 included in the electric vehicle 1 will be described with reference to FIG. 3. As shown in FIG. 3, the control device 30 collectively controls operation of the entire vehicle including various configurations of the electric vehicle 1. The control device 30 includes a processor that executes various types of processing, a memory, and the like. The memory is constituted by a storage medium such as a Read Only Memory (ROM) and a Random Access Memory (RAM) depending on application. The memory stores, for example, a control program that controls the above-described various configurations.

As described above, electric signals output from the various configurations of the electric vehicle 1 are transmitted to the control device 30. For example, an image from the front of the electric vehicle 1 imaged by the camera 28 is output to the control device 30. The control device 30 calculates a distance to an obstacle in front of the vehicle based on the image.

A detection value of the vehicle speed sensor 29 and a detection value of the steering sensor 27 are output to the control device 30. The control device 30 calculates the traveling speed of the electric vehicle 1 and the steering angle of the steering wheel unit 10 based on these detected values.

When an obstacle is detected in the front side in the traveling direction based on such information (output), the control device 30 according to the present embodiment performs collision preventing control to avoid a collision between the obstacle and the host vehicle (the electric vehicle 1). As will be described in detail below, examples of the collision preventing control by the control device 30 include (1) displaying a warning on the display unit 21, (2) issuing an alarm by the speaker 24, (3) controlling the motor 9 to perform braking, and the like.

An example of a control device of an electric vehicle for an elderly person in the related art includes such a device in which a device capable of measuring a three-dimensional shape, for example, a distance image camera, is attached to the electric vehicle. With such an electric vehicle, a failure due to unevenness of a traveling destination is detected, a driver is notified, and vehicle control (vehicle speed control such as deceleration and stop, steering direction control, and the like) determined by a distance from an obstacle, a vehicle speed, or the like is performed.

According to such control, chances of collisions of the vehicle with an obstacle can be reduced for the safety of the driver. However, excessive vehicle control may impair usability. When an obstacle that does not need to be detected is detected, unintended behavior of a user (the driver) is assumed to be caused.

Accordingly, it is desirable to carry out collision preventing control in an electric vehicle such as a power scooter without causing discomfort to a driver. In the present embodiment, the camera 28 is provided as an obstacle detection unit that detects an obstacle in front of the electric vehicle 1 in the traveling direction. The control device 30 performs predetermined collision preventing control based on an output of the camera 28. As described above, examples of the collision preventing control include (1) displaying a warning on the display unit 21, (2) issuing an alarm by the speaker 24, (3) controlling the motor 9 to perform braking, and the like.

The electric vehicle 1 further includes a cancel switch 33 as a releasing unit that temporarily releases the above-described collision preventing control by operation of the driver. The cancel switch 33 is provided, for example, in the switch box 12. The cancel switch 33 is constituted by a push-button switch. The cancel switch 33 temporarily releases (cancels) the collision preventing control by being operated by the driver during the collision preventing control.

The control device 30 includes a risk level determination unit 31 that determines a collision risk level between an obstacle and the electric vehicle 1 based on a distance therebetween, and a control level adjustment unit 32 that adjusts a control level of the collision preventing control based on the collision risk level and performs the collision preventing control with the adjusted control level.

The risk level determination unit 31 determines the collision risk level based on a risk level region to which the obstacle belongs among a plurality of risk level regions (which may also be referred to as determination regions) preliminarily determined in accordance with the distance to the host vehicle within the imaging range of the camera 28 in the front side in the traveling direction of the electric vehicle 1.

When the cancel switch is operated by the driver during the collision preventing control, the control level adjustment unit 32 lowers the control level of the collision preventing control described above and causes the display unit 21 to display presence of the obstacle. For example, a warning prompting the presence of the obstacle is displayed on the display unit 21.

According to these configurations, when the driver operates the cancel switch 33 to temporarily release the collision preventing control during the collision preventing control, it is possible to prevent unnecessary collision preventing control by lowering the control level. At that time, the presence of the obstacle is displayed on the display unit 21. By doing so, the presence of the obstacle can be recognized again (recalled) by the driver even if the relatively elderly driver is distracted from the presence of the obstacle after operating the cancel switch 33. Therefore, it is possible to appropriately perform the collision preventing control and ensure the safety of the driver without causing discomfort to the driver.

The risk level determination unit 31 determines the collision risk level based on the distance between the obstacle and the electric vehicle 1 and an expected path of the electric vehicle 1. After the operation of the cancel switch 33 by the driver, the control level adjustment unit 32 resumes the collision preventing control on a condition that the collision level is lowered.

According to this configuration, after the driver operates the cancel switch 33, the collision preventing control is performed again when the collision risk level is lowered by taking a retreat action from the obstacle via some operation relative to the obstacle. Therefore, even when the driver forgets the fact of temporarily operating the cancel switch 33, the collision preventing control can be automatically resumed and the safety of the driver can be further enhanced.

In the above example, the control device 30 includes the risk level determination unit 31 and the control level adjustment unit 32 as a plurality of functional blocks and the functional blocks are merely examples for convenience. The control device 30 is not limited to these functional blocks and may include other functional blocks. The control device 30 does not have to explicitly include these functional blocks. The control device 30 may comprehensively perform various types of control described above. That is, the control device 30 may comprehensively implement functions of the risk level determination unit 31 and the control level adjustment unit 32.

Figure 4:
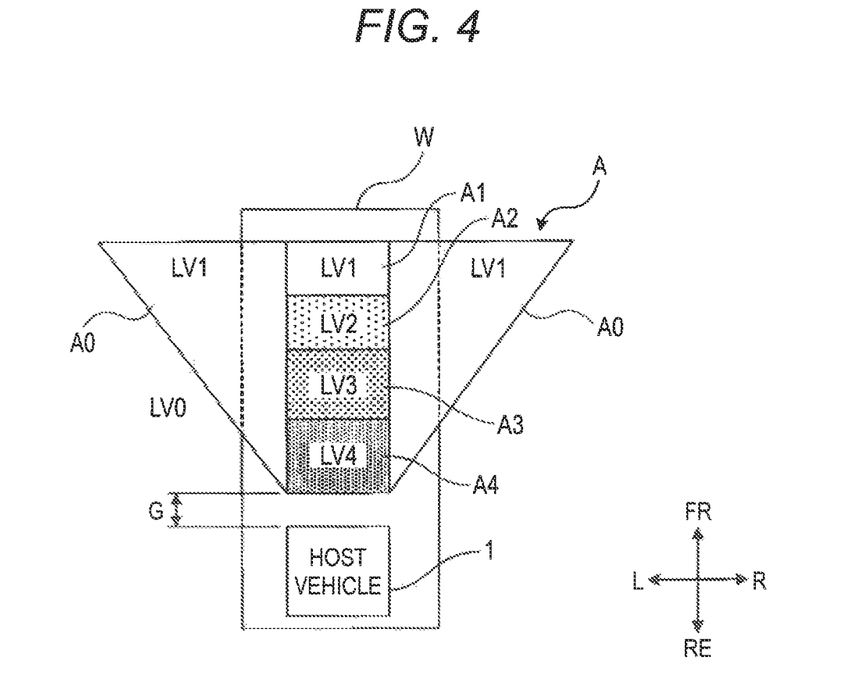
FIG. 4 is a schematic diagram of determination regions for determining a collision risk level of collision preventing control according to the present embodiment.
Figure 5:
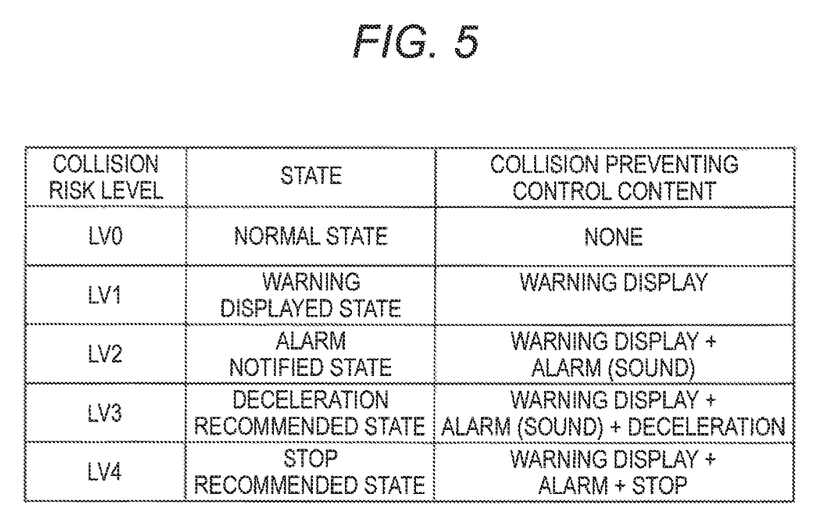
FIG. 5 is a table showing collision preventing control (control levels) for each collision risk level according to the present embodiment.
Figure 6:
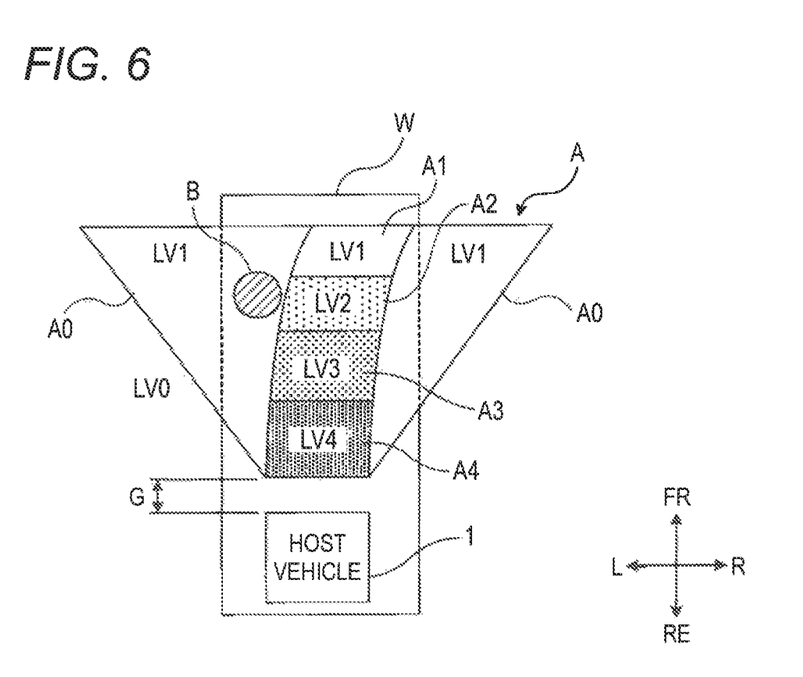
FIG. 6 is another schematic diagram of the determination regions for determining the collision risk level of collision preventing control according to the present embodiment.

Herein a relationship between the collision risk level and the collision preventing control according to the present embodiment will be described with reference to FIGS. 4 to 6. FIG. 4 is a schematic diagram of determination regions for determining the collision risk level of the collision preventing control according to the present embodiment. FIG. 5 is a table showing the collision preventing control (control levels) for each collision risk level according to the present embodiment. FIG. 6 is another schematic diagram of the determination regions for determining the collision risk level of the collision preventing control according to the present embodiment.

As shown in FIG. 4, the electric vehicle 1 serving as the host vehicle is traveling in the middle of a sidewalk W extending forward and backward. The left-right width of the sidewalk W is sufficiently larger than the left-right width of the electric vehicle 1. The camera 28 (see FIGS. 1 and 3) has a predetermined imaging range A in front of the electric vehicle 1 with a gap G that is a blind area part separating the range A from the host vehicle. The imaging range A has a trapezoidal shape in a plan view in which the left-right width increases toward the front. The imaging range A is divided into a plurality of regions each constituting the above-described risk level region. The imaging range A is divided into six regions according to the distance from the electric vehicle 1. Specifically, the imaging range A includes regions A1 to A4 in front of the electric vehicle 1 that have a rectangular shape in a plan view and show the expected path of the host vehicle, and a pair of right and left right triangular regions A0 on two sides of the regions A1 to A4.

The rectangular regions A1 to A4 are arranged side by side in a front-rear direction of the sidewalk W and are the regions A1, A2, A3, and A4 as approaching the host vehicle from a distant location. Left-right widths of the regions A1 to A4 are preferably substantially the same as or larger than the left-right width of the host vehicle.

In the present embodiment, the imaging range A divided into the regions A0 to A4 is stored (set) in the control device 30 in advance. The control device 30 (the risk level determination unit) determines the collision risk level based on a position of the obstacle in front of the host vehicle within the imaging range A.

The collision risk level decreases as the distance between the obstacle and the electric vehicle 1 increases. This is because chances of collisions with the obstacle decrease as the obstacle moves away from the electric vehicle 1. For example, in FIG. 4, the collision risk level of a region outside the imaging range A of the camera 28 is LV0. Further, the collision risk level of the regions A0 and A1 is LV1. Collision risk levels of the regions A2 to A4 are LV2 to LV4, respectively. In this way, the collision risk level increases as approaching the electric vehicle 1.

In the present embodiment, a type of the collision preventing control to the host vehicle changes according to the determined collision risk level (the control level is adjusted). As shown in FIG. 5, when the collision risk level is LV0, that is, when the obstacle is outside the imaging range A of the camera 28, the control level is zero, which refers to a normal state. In this case, the collision preventing control is not performed since no influence would be applied to traveling of the electric vehicle 1.

When the collision risk level is LV1, that is, when the obstacle is in the region A0 or the region A1, the control level is one, which refers to a warning displayed state. As the specific control content, a warning is displayed on the display unit 21 to prompt the driver to pay attention. This is based on an idea that a display only would be sufficient since the obstacle is at a relatively distant position relative to the host vehicle. As an example of the warning, it is effective to display a direction, a type, and the like of the obstacle.

When the collision risk level is LV2, that is, when the obstacle is in the region A2, the control level is two, which refers to an alarm notified state. As the specific control content, a warning is displayed on the display unit 21, and an alarm sound is further issued from the speaker 24 to prompt the driver to pay attention. This is based on an idea of notifying the driver of danger by adding an alarm by audio since the obstacle is located closer to the host vehicle as compared with the case of the control level 1. As an example of the alarm, audio guidance such as "please pay attention" or a buzzer sound is effective.

When the collision risk level is LV3, that is, when the obstacle is in the region A3, the control level is three, which refers to a deceleration recommended state. As the specific control content, the electric vehicle 1 is decelerated in addition to the content of the control level 2. This refers to an idea that, since the obstacle is even closer to the host vehicle as compared with the case of the control level 2, only the alarm display plus the warning issue is insufficient and deceleration control is also performed to avoid a collision. It is more effective to set the alarm to be louder than that of the control level 2 and advance its issuance cycle.

When the collision risk level is LV4, that is, when the obstacle is in the region A4, the control level is four, which refers to a stop recommended state. As the specific control content, the electric vehicle 1 is stopped instead of the deceleration control of the control level 2. This refers to an idea of stopping the host vehicle to avoid the collision reliably since the obstacle is further closer to the host vehicle as compared with the case of the control level 3 and a collision may occur accompanying the deceleration. It is more effective to set the alarm to be louder than that of the control level 3 and advance its issuance cycle.

In this way, it is possible to implement more appropriate collision avoidance to the host vehicle by properly changing the control level according to the collision risk level. That is, the control level increases as the collision level increases. The variation of the collision risk level and the control level is not limited to the above example and may be changed as appropriate. For example, when a plurality of different obstacles in the same direction are detected, an obstacle that is closer to the host vehicle may be given priority. When there are a plurality of obstacles in another direction, an obstacle that is closest to the host vehicle may be given priority. As described above, by setting the collision risk level of the region A0 outside the regions A1 to A4 that are the expected path of the host vehicle to LV1, it is possible to provide a safe state without impairing comfortable driving performance for the driver. The region A0 may be alerted when, for example, there is a gutter on a side of the sidewalk W.

After the collision preventing control is performed, the driver may avoid the obstacle or release the collision preventing control. For example, when the driver visually recognizes an obstacle, it is assumed that the driver feels uncomfortable about the collision preventing control (unnecessary alarm or deceleration). Therefore, the present embodiment provides the following control release method.

(1) Obstacle Out of Predetermined Region Due to Steering Operation of Driver

For example, in a case of an obstacle in the region A2 of FIG. 4, the regions A0 to A4 change in accordance with the steering angle of the electric vehicle 1 when the driver performs a steering operation, as is shown in FIG. 6. In FIG. 6, by switching the handlebars 11 to the right, the regions A1 to A4, which are the expected path of the host vehicle, change in a curved shape toward the right side. As a result, an obstacle B exits the region A2 and now belongs in the region A0. In this case, the control device 30, instead of issuing an alarm as the collision preventing control of the control level 2, lowers the control level to one and performs control to display only a warning on the display unit 21 since the obstacle B belongs to the region A0. Accordingly, an alarm by audio is released and the discomfort to the driver can be eliminated.

(2) Pressed Cancel Switch 33

When the collision risk level is LV2 to LV4, the driver may temporarily release the collision preventing control by operating the cancel switch 33. In this case, the control device 30 resumes the collision preventing control on a condition that the collision risk level is equal to or lower than LV1. When the collision risk level is LV2 or LV3, the collision preventing control can be canceled even when the host vehicle is traveling. When the collision risk level is LV4, the collision preventing control cannot be canceled until the host vehicle is stopped. Accordingly, discomfort to the driver can be eliminated.

(3) No Intention of Traveling

When the driver stops traveling while the collision risk level is LV1 to LV3, the control level is set to one or the collision preventing control is ended. This is because it can be said that chances of collisions with an obstacle are reduced by stopping the host vehicle.

(4) Completely Turned Off Collision Preventing Control

When the driver has confidence in driving and does not want to use any collision preventing control, the collision preventing control may be completely stopped (that is, fixing the collision risk level always to LV0) by long-pressing the cancel switch 33. Complete cancellation of the collision preventing control is set only at the time of stop of the host vehicle.

In this way, in the present embodiment, the driver can avoid a collision before the vehicle is stopped, for example, by performing the collision preventing control using the expected path of the electric vehicle 1, the imaging range of the camera 28, and the distance between the obstacle and the host vehicle. Therefore, it is possible to perform a smooth operation without deceleration or stop due to unnecessary vehicle control. Further, it is possible to ensure the safety of the driver in advance by warning the driver with the display unit 21 or the like of the presence of the obstacle in the front side in the traveling direction of the host vehicle while traveling. Further, the driver can avoid the obstacle by themselves before the vehicle is stopped by distinguishing the collision risk level and the control level in accordance with the position of the obstacle so that excessive vehicle control can be prevented. In addition, it is possible to prompt the driver to avoid the obstacle since the driver is notified of a danger level stepwise.

Figure 7:
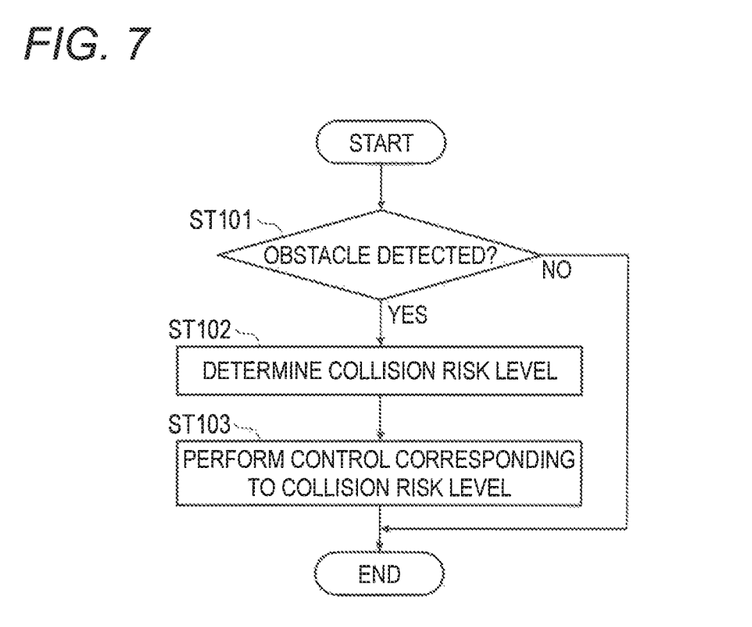
FIG. 7 is a flowchart showing an example of vehicle control according to the present embodiment.
Figure 8:
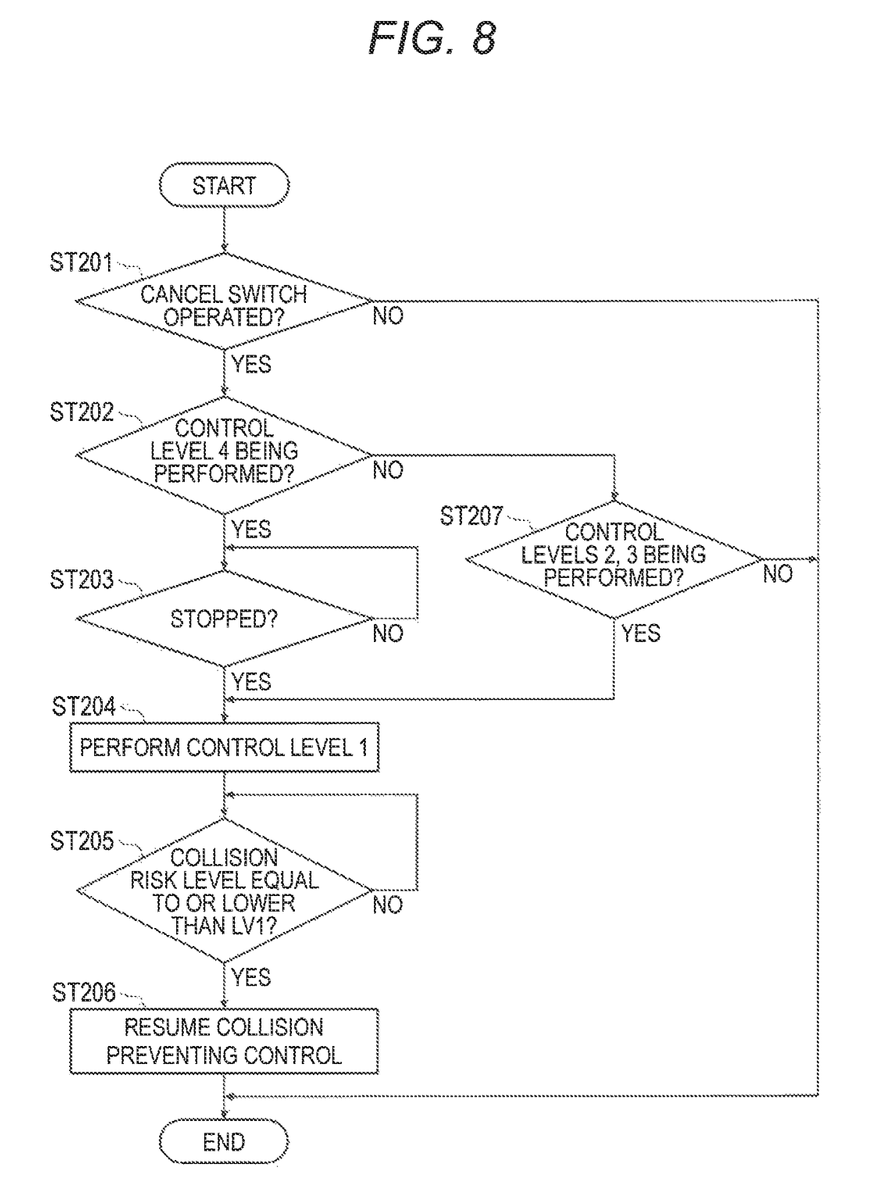
FIG. 8 is a flowchart showing another example of vehicle control according to the present embodiment.

Next, a control flow according to the present embodiment will be described with reference to FIGS. 7 and 8. FIGS. 7 and 8 show examples of the control flow according to the present embodiment. In the following flows, unless otherwise specified, operation (calculation, determination, and the like) is performed mainly by the control device 30. In control flows shown in FIGS. 7 and 8, it is assumed that the processing from "start" to "end" is repeated at predetermined time intervals.

First, a flow of the collision preventing control will be described. As shown in FIG. 7, when the control is started, in step ST101, the control device 30 determines whether an obstacle is detected. For example, the control device 30 can determine whether the obstacle is detected based on whether the obstacle is in the imaging range A of the camera 28. When the obstacle is detected (step ST101: YES), the process proceeds to step ST102. When no obstacle is detected, that is, no obstacle is within the imaging range A (step ST101: NO), the collision preventing control is not necessary, the collision risk level is LV0, and the control is ended.

In step ST102, the control device 30 calculates the collision risk level. Specifically, the risk level determination unit 31 determines (calculates) the collision risk level based on a region to which the obstacle belongs among the regions A0 to A4, in addition to the distance between the obstacle and the host vehicle, the steering angle of the handlebars 11, the vehicle speed, and the like. Then, the process proceeds to step ST103.

In step ST103, the control device 30 performs the collision preventing control at a control level corresponding to the determined collision risk level. The specific control content is as described above. Accordingly, the control ends.

Next, a temporary release and resumption flow of the collision preventing control will be described. In FIG. 8, it is assumed that some collision preventing control is performed in advance. As shown in FIG. 8, when the control is started, in step ST201, the control device 30 determines whether the cancel switch 33 was operated (pressed) by the driver. When the cancel switch 33 was operated (step ST201: YES), the process proceeds to step ST202. When the cancel switch 33 is not operated (step ST201: NO), the control is ended.

In step ST202, the control device 30 determines whether the collision preventing control of the control level 4 is being performed. When the collision preventing control of the control level 4 is being performed (step ST202: YES), the process proceeds to step ST203. When the collision preventing control of the control level 4 is not being performed (step ST202: NO), the process proceeds to step ST207.

In step ST203, the control device 30 determines whether the electric vehicle 1 is stopped. When the electric vehicle 1 is stopped (step ST203: YES), the process proceeds to step ST204. When the electric vehicle 1 is not stopped (step ST203: NO), the processing of step ST203 is repeated. That is, step ST203 is a step of waiting until the vehicle is stopped by automatic braking.

In step ST204, the control device 30 lowers the control level to one and performs the collision preventing control. Then, the process proceeds to step ST205.

In step ST205, the control device 30 determines whether the collision risk level is equal to or lower than LV1. When the collision risk level is equal to or lower than LV1 (step ST205: YES), the process proceeds to step ST206. When the collision risk level is not equal to or lower than LV1 (step ST205: NO), the processing of step ST205 is repeated. That is, step ST205 is a step of waiting for the collision risk level to decrease to LV1 by an avoidance action of the driver themselves.

In step ST206, the control device 30 resumes the temporarily released collision preventing control and performs normal vehicle control. Then, the control ends.

In step ST207, the control device 30 determines whether the collision preventing control of the control level 2 or 3 is being performed. When the collision preventing control of the control level 2 or 3 is being performed (step ST207: YES), the process proceeds to step ST204 to immediately lower the control level to perform the collision preventing control of the control level 1. When the collision preventing control of the control level 2 or 3 is not being performed (step ST207: NO), the collision preventing control of the current control level 1 is being performed and the control is ended as it is.

In this way, in the present embodiment, after being temporarily canceled, the collision preventing control is automatically resumed on the condition that the control level is lowered. According to this configuration, it is possible to prevent the driver from forgetting to resume the collision preventing control. Since the collision preventing control is automatically resumed, manual resumption is not necessary each time the driver operates the cancel switch 33. This is because it would be troublesome for the driver to manually resume the collision preventing control each time. For example, when obstacles (pedestrians, bicycles, or the like) always come in front at a busy place, the collision preventing control is canceled and resumed each time the driver passes an obstacle after the above control is canceled once, making the operation troublesome.

When the control level is in the alarm notified state (2) or the deceleration recommended state (3), the control level adjustment unit 32 immediately sets the control level to the warning displayed state (1), and when the control level is in the stop recommended state (4), the control level is set to the warning displayed state (1) on the condition that the electric vehicle is stopped. In this way, when the control level is two or three, the collision preventing control can be canceled even during traveling of the vehicle, whereas when the control level is four, the collision preventing control can be canceled under the condition that the vehicle is stopped. This is for ensuring avoidance time for prompting the avoidance action by the driver and a braking distance of the electric vehicle 1 because the obstacle is very close to the host vehicle when the control level is four.

As described above, according to the present embodiment, it is possible to perform collision preventing control in the electric vehicle 1 such as a power scooter without causing discomfort to the driver.

The above embodiment describes the camera 28 as an example of the obstacle detection unit, but the present disclosure is not limited thereto. A sensor such as a laser radar may be adopted as the obstacle detection unit. In this case, it is preferable for the laser radar to have a predetermined illuminating range in front of the vehicle.

The above embodiment describes a case where the camera 28 has the imaging range A having a trapezoidal shape in a plan view in the front side in the traveling direction of the electric vehicle 1, but the present disclosure is not limited thereto. For example, an omnidirectional camera having a circular imaging range in a plan view may be used.

In the above embodiment, the division method of the plurality of risk level regions may be changed as appropriate. The number and arrangement locations of the regions are not limited to those described above, and a plurality of regions may be divided in a road width direction (left-right direction), for example. Further, an overlap part may be provided at a boundary of adjacent regions, and hysteresis may be provided during control switching. Accordingly, frequent control switching can be prevented.

The above embodiment describes a person or a bicycle as an example of the obstacle, but the present disclosure is not limited thereto. The obstacle may include anything that hinders the traveling of the electric vehicle 1 such as a step or a wall.

Although the present embodiment and the modification have been described, they may be combined in whole or in part as another embodiment of the present disclosure.

Embodiments of the present disclosure are not limited to the above embodiment and various changes, substitutions and modifications may be made without departing from the scope of the technical idea of the present disclosure. Further, the present disclosure may be implemented by use of other methods as long as the technical concept of the present disclosure can be implemented by the methods through advance of technology or other derivative technology. Accordingly, the present invention cover all embodiments that may fall within the scope of the technical idea of the present invention.

As described above, the present disclosure has such an effect that collision preventing control can be performed in an electric vehicle such as a power scooter without causing discomfort to a driver, and is particularly useful for a control device and an electric vehicle.

What is claimed is:

1. A control device configured to perform a collision preventing control between an obstacle and an electric vehicle based on an output of an obstacle detection unit which is configured to detect the obstacle within a predetermined range in a traveling direction of the electric vehicle, the control device comprising:
   a risk level determination unit configured to determine a collision risk level between the obstacle and the electric vehicle based on a distance between the obstacle and the electric vehicle; and
   a control level adjustment unit configured to adjust a control level of the collision preventing control based on the collision risk level and perform the collision preventing control with the adjusted control level,
   wherein the control level adjustment unit lowers the control level and causes the electric vehicle to display presence of the obstacle when a releasing unit configured to temporarily release the collision preventing control is operated by a driver during the collision preventing control.

2. The control device according to claim 1,
   wherein the risk level determination unit determines the collision risk level based on the distance between the obstacle and the electric vehicle and an expected path of the electric vehicle, and
   wherein when the releasing unit is operated, the control level adjusting unit resumes the collision preventing control on a condition that the collision risk level is lowered.

3. The control device according to claim 1, wherein the collision risk level decreases as the distance between the obstacle and the electric vehicle increases.

4. The control device according to claim 1, wherein the risk level determination unit determines the collision risk level based on a determination region to which the obstacle belongs among a plurality of determination regions preliminarily determined in accordance with a distance from the electric vehicle within a detection range of the obstacle detection unit.

5. The control device according to claim 4, wherein the plurality of determination regions change in accordance with a steering angle of the electric vehicle.

6. The control device according to claim 1,
   wherein the control level increases as the collision risk level increases, and
   wherein the control level includes:
      a warning displayed state in which a warning is displayed on a display unit;
      an alarm notified state in which an alarm sound is issued in addition to displaying the warning;
      a deceleration recommended state in which deceleration of the electric vehicle is performed in addition to displaying the warning and issuing the alarm sound; and
      a stop recommended state in which the electric vehicle is stopped instead of decelerated in the deceleration recommended state.

7. The control device according to claim 6, wherein if the control level is in the alarm notified state or the deceleration recommended state when the releasing unit is operated, the control level adjustment unit immediately sets the control level to the warning displayed state, and if the control level is in the stop recommended state when the releasing unit is operated, the control level is set to the warning displayed state on the condition that the electric vehicle is stopped.

8. An electric vehicle comprising:
   an obstacle detection unit configured to detect an obstacle within a predetermined range in a traveling direction of the electric vehicle;
   a display unit configured to display presence of the obstacle;
   a control device configured to perform a collision preventing control between the obstacle and the electric vehicle based on an output of the obstacle detection unit; and
   a releasing unit configured to temporarily release the collision preventing control,
   wherein the control device includes:
      a risk level determination unit configured to determine a collision risk level between the obstacle and the electric vehicle based on a distance between the obstacle and the electric vehicle; and
      a control level adjustment unit configured to adjust a control level of the collision preventing control based on the collision risk level and perform the collision preventing control with the adjusted control level, and
   wherein the control level adjustment unit lowers the control level and causes the display unit to display the presence of the obstacle when the releasing unit is operated by a driver during the collision preventing control.

* * * * *